(12) United States Patent
Lu et al.

(10) Patent No.: US 12,438,711 B2
(45) Date of Patent: Oct. 7, 2025

(54) KEY GENERATION METHOD, APPARATUS, ELECTRONIC DEVICE AND STORAGE MEDIUM

(71) Applicant: ZTE CORPORATION, Guangdong (CN)

(72) Inventors: Haitao Lu, Guangdong (CN); Lijun Yang, Guangdong (CN); Boqing Chen, Guangdong (CN); Lin Guo, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 382 days.

(21) Appl. No.: 18/095,773

(22) Filed: Jan. 11, 2023

(65) Prior Publication Data

US 2023/0171096 A1 Jun. 1, 2023

Related U.S. Application Data

(63) Continuation of application No. PCT/CN2021/123855, filed on Oct. 14, 2021.

(30) Foreign Application Priority Data

Nov. 2, 2020 (CN) .......................... 202011204835.0

(51) Int. Cl.
*H04L 9/08* (2006.01)
*H04L 9/14* (2006.01)

(52) U.S. Cl.
CPC .............. *H04L 9/0869* (2013.01); *H04L 9/14* (2013.01)

(58) Field of Classification Search
CPC ..... H04L 9/0869; H04L 9/14; H04L 2209/80; H04L 9/0875; H04L 9/0861
(Continued)

(56) References Cited

U.S. PATENT DOCUMENTS 6,459,791 B1 10/2002 David et al.
10,129,022 B1 11/2018 Al Faruque et al.
(Continued)

FOREIGN PATENT DOCUMENTS

CN 1224555 A 7/1999
CN 104253685 12/2014
(Continued)

OTHER PUBLICATIONS

EESR of the corresponding EP Patent Application No. 21884946.1 dated Sep. 10, 2024.
(Continued)

*Primary Examiner* — Jacob Lipman
(74) *Attorney, Agent, or Firm* — NZ Carr Law Office (57) ABSTRACT

Disclosed are a key generation method, apparatus, an electronic device, and a storage medium. The key generation method comprises: obtaining a channel characteristic parameter of a wireless channel; generating a key according to the channel characteristic parameter; capturing after continuously generating multiple keys, a first key matrix by means of a sliding window having a preset length, to obtain a second key matrix; determining a correlation between keys in the second key matrix, and performing key substitution on the keys in the second key matrix when the correlation between the keys in the second key matrix is greater than a preset threshold; and adding the keys in the second key matrix to a key pool until the number of keys in the key pool reaches a preset number.

10 Claims, 6 Drawing Sheets

(58) Field of Classification Search
USPC .......................................................... 380/44
See application file for complete search history.

(56) References Cited

U.S. PATENT DOCUMENTS

| | | | |
|---|---|---|---|
| 2015/0365229 A1 | 12/2015 | Patey et al. | |
| 2017/0338956 A1 | 11/2017 | Badawy et al. | |
| 2021/0391990 A1* | 12/2021 | McElveen | H04L 9/0825 |

FOREIGN PATENT DOCUMENTS

| | | | |
|---|---|---|---|
| CN | 107528687 | | 12/2017 |
| CN | 107819760 | | 3/2018 |
| CN | 110061834 | | 7/2019 |
| CN | 110061834 A | * | 7/2019 |
| CN | 110213767 | | 9/2019 |
| JP | 2013247439 | | 12/2013 |
| KR | 20160132777 | | 11/2016 |
| WO | 2008060824 | | 5/2008 |

OTHER PUBLICATIONS

International search report of the corresponding PCT Application No. PCT/CN2021/123855 issued on Jan. 6, 2022 along with English translation thereof.

* cited by examiner

KEY GENERATION METHOD, APPARATUS, ELECTRONIC DEVICE AND STORAGE MEDIUM

CROSS REFERENCE TO RELATED APPLICATION

The present application is a continuation application of PCT Patent Application No. PCT/CN2021/123855, filed on Oct. 14, 2021, which is based on the Chinese patent application with the application number of "202011204835.0" field on Nov. 2, 2020, and claims the priority of the Chinese patent application, the entire contents of which are incorporated herein by reference.

TECHNICAL FIELD

Embodiments of the present application relate to the technical field of communications, and in particular, to a key generation method, apparatus, an electronic device, and a storage medium.

BACKGROUND

Wireless communication has been widely used in military and civil fields, but a security of wireless information transmission is low because of an open characteristic of wireless communication. A traditional solution is to encrypt data through public and private keys at the network layer. However, in dynamic wireless networks, symmetric encryption methods need to solve a problem of key distribution in wireless communication. Additional complexity and cost is induced by key distribution, which makes it impossible to update the key quickly or achieve one-time pad. In general, a physical layer key generation method based on the wireless channel is used to encrypt the wireless channel, such as an adaptive channel detection scheme based on the Proportional Integral Differential (PID) controller, and a received signal strength (RSS) is used as a channel characteristic. A mathematical model for a key generation rate is established first to verify that a channel detection rate is proportional to the key rate. The most important feature of this method is to use the reciprocity of uplink and downlink channel characteristics in the coherent time to obtain a key directly from channel parameters. Operation cost of this method is generally lower than that of traditional network layer encryption methods, and there is no problem of key distribution.

However, when the user requires a high key rate, the detection rate will be adaptively improved in the key generation method, thereby reducing the randomicity between measured values, and meanwhile affecting the security of the key.

SUMMARY

In the embodiments of the present application, a key generation method is provided, including: obtaining a channel characteristic parameter of a wireless channel; generating a key according to the channel characteristic parameter; capturing after continuously generating multiple keys, a first key matrix by means of a sliding window having a preset length, to obtain a second key matrix; determining the correlation between the keys in the second key matrix, and performing key substitution on the keys in the second key matrix when the correlation between the keys in the second key matrix is greater than a preset threshold; and adding the keys in the second key matrix to a key pool until the number of the keys in the key pool reaches a preset number.

In the embodiments of the present application, a key generating apparatus is further provided, including: a parameter acquisition module for obtaining a channel characteristic parameter of a wireless channel; a key generation module for generating a key according to the channel characteristic parameter; a sliding capture module for capturing after continuously generating multiple keys, a first key matrix by means of a sliding window having a preset length, to obtain a second key matrix; a key substitution module for determining a correlation between keys in the second key matrix; and performing key substitution on the keys in the second key matrix when the correlation between the keys in the second key matrix is greater than a preset threshold; a key selection module for adding the keys in the second key matrix to a key pool until the number of the keys in the key pool reaches a preset number.

In the embodiments of the present application, an electronic device is further provided, including: at least one processor; and a storage in communication with the at least one processor; wherein, the storage stores instructions that is executable by the at least one processor, the instructions when executed by the at least one processor, enables the at least one processor performs the key generation method as described above.

In the embodiments of the present application, a computer-readable storage medium is further provided, which stores a computer program, the computer program when executed by the processor, implements the key generation method as described above.

DETAILED DESCRIPTION

The main purpose of the embodiments of the application is to propose a key generation method, apparatus, electronic device and storage medium, capture the keys generated for many times by means of a sliding window, and substitute the key with high correlation, so as to improve the security of the key during high-speed key generation.

In order to make the purpose, technical solution and advantages of the embodiments of the application more clear, the embodiments of the application will be described in detail below in combination with the drawings. However, those skilled in the art could understand that in each embodiment of the application, many technical details are proposed to enable readers to better understand the application. However, even without these technical details and various changes and modifications based on the following embodiments, the technical solution claimed in the present application can be realized. The following division of embodiments is for the convenience of description, and shall not limit the specific implementation of the present application. All embodiments can be combined and referred to each other without contradiction.

In a first embodiment of the present application, a key generation method is provided, including: obtaining a channel characteristic parameter of a wireless channel; generating a key according to the channel characteristic parameter; capturing after continuously generating multiple keys, a first key matrix by means of a sliding window having a preset length, to obtain a second key matrix; determining the correlation between the keys in the second key matrix, and performing key substitution on the keys in the second key matrix when the correlation between the keys in the second key matrix is greater than a preset threshold; and adding the keys in the second key matrix to a key pool until the number of the keys in the key pool reaches a preset number.

Figure 1:
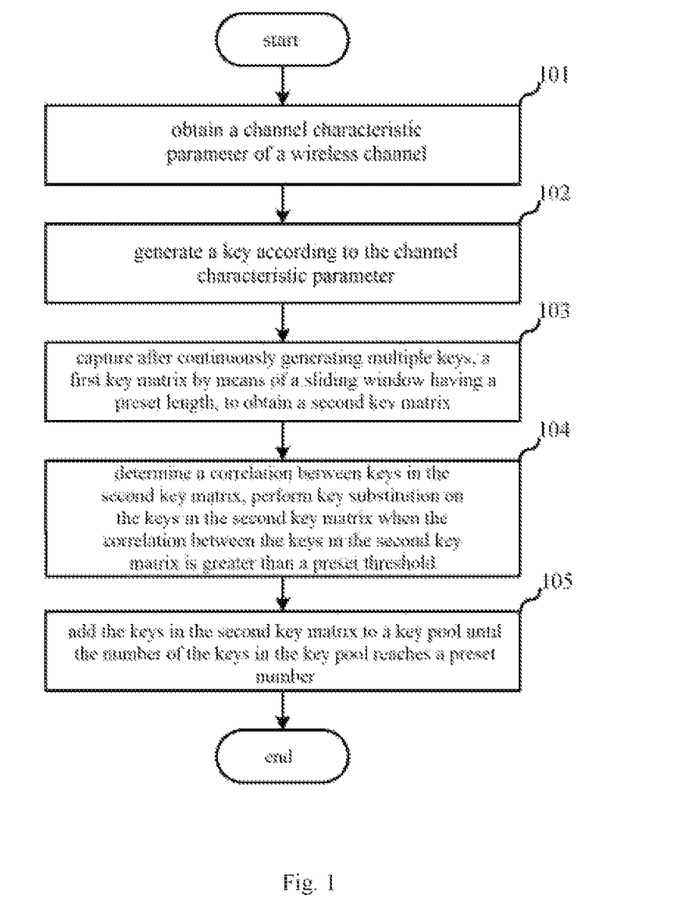
FIG. 1 is a flowchart of a key generation method according to a first embodiment of the present application.

The present embodiment is further illustrated below with reference to the drawings. The key generation method in this embodiment is shown in FIG. 1, and includes step 101 to step 105.

At a step of 101, a channel characteristic parameter of a wireless channel is obtained.

Specifically, the channel characteristic parameter of the wireless channel belongs to the physical characteristic of the channel. Due to the reciprocity of the uplink and downlink channels in the coherent time, the channel characteristic parameters collected by the communication parties are basically the same. Since the collected channel characteristic parameters are highly consistent, it can ensure that the difference between the keys generated at the upper and lower ends is generally very small. The same key is finally obtained through information reconciliation and correction of the initial key by the communication parties. A operation cost of obtaining the key directly from the channel parameters is generally lower than that of the traditional network layer encryption methods, and there is no problem of key distribution.

In an example, the channel model is used to obtain the channel characteristic parameters. First, the detection parameters of the channel is obtained after the wireless channel is detected, and then the channel characteristic parameters are calculated based on the detection parameters and the preset channel model. The key generation method in this embodiment is applied to the millimeter wave communication scene, and the millimeter wave is usually modeled using a narrow-band cluster ray model. The cluster ray model is a channel model commonly used in millimeter wave hybrid precoding and channel estimation, whose main parameters include angle of arrival, angle of departure and path gain. Assuming that the millimeter wave channel is composed of different clusters, and each cluster contains only a is satisfied. Specifically, assuming that a base station is equipped with $N_t$ antennas, and a user is equipped with $N_r$ antennas, a channel matrix H contains $N_{cl}$ clusters, and there are $N_{ray}$ propagation paths in each cluster, the channel is represented by the following formula:

$$H = \sqrt{\frac{N_t N_r}{N_{cl} N_{ray}}} \sum_{i,l} \alpha_{il} a_r(\theta_{il}) a_t(\emptyset_{il})^H$$

wherein $\alpha_{il}$ is a path complex gain of the l-th ray in the i-th cluster, that is, the path gain parameter represented by the complex number. $\theta_{il}$ and $\emptyset_{il}$ are respectively the Angle of Arrival (AoA) and Angle of Departure (AoD) of the corresponding path.

$a_r(\theta_{il})$ and $a_t(\emptyset_{il})$ represent the array response vectors of the base station and legitimate users. Since the millimeter wave has only a limited number of spatial propagation paths, its main parameters include angle of arrival, angle of departure and path gain. According to the characteristics of the millimeter wave channel, the compression sensing technology is used for channel estimation, and the characteristic parameters of the channel are calculated by comparing the reference signals of the receiving end and the transmitting end. In this embodiment, the channel characteristic parameters obtained are path gain parameters.

Furthermore, the orthogonal matching pursuit algorithm in compressed sensing is adopted for the channel estimation in this embodiment to estimate the channel. The angle domain $[0, \pi]$ is divided into 180 grids as a candidate set of angles of arrival and angles of departure, that is, 1° is the minimum unit to distinguish the angle of arrival and angle of departure, and the perception matrix is further designed. When designing the perception matrix, the overall correlation between the column vectors of the perception matrix is as low as possible. The angle with the highest correlation with the channel detection value is selected from the candidate set as the combination pair of the angle of arrival and angle of departure, and a path gain parameter value $\alpha_1$ related to this combination pair is estimated.

In addition, the cluster ray model used in this embodiment can also be replaced by other millimeter wave channel models, and the channel characteristic parameters referenced by quantization are not limited to the above-mentioned path gain parameters.

In the specific implementation, the millimeter wave channel estimation is simulated and performance analyzed. The channel is estimated using the Orthogonal Matching Pursuit (OMP) method, and the least square (LS) estimation, Oracle estimation and OMP estimation are compared. Assuming the number of antennas $N_t=N_r=32$, the number of radio frequency links $$N_{RF}^t = \qquad N_{RF}^r = 8,$$

the channel contains five clusters, and there is only one propagation path in each cluster, that is, L=5, while the path gain follows $\alpha_{il} \sim \mathcal{CN}(0,1)$, the mean angle of arrival/departure in each cluster follows the uniform distribution of $[0, 2\pi]$, and the standard deviation $\sigma_{AS}=15$. 24 training beams are used to conduct pilot training for both the base station and the user use, $$N_t^{beam} = \qquad N_r^{beam} = 24,$$

the power of the pilot symbol is 1. The channel is simulated for 500 times to obtain the average channel estimation error.

Figure 2:
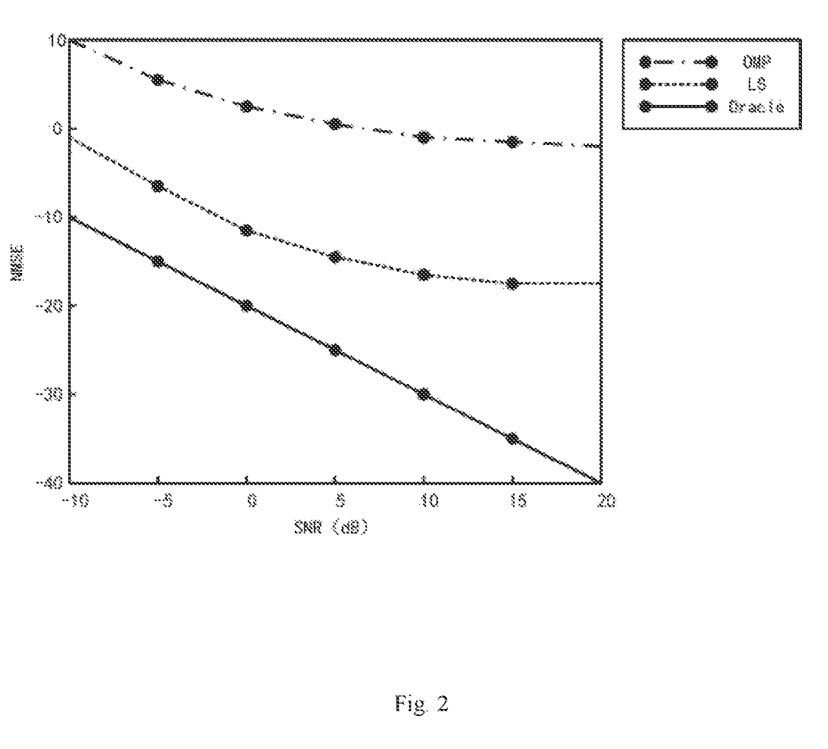
FIG. 2 is a statistical diagram for channel estimation errors in each channel estimation method according to the first embodiment of the present application.

The estimation errors of different estimation methods are shown in FIG. 2. The normalized mean square error (NMSE) between the estimated channel and the original channel is defined as:

$$10\log_{10}\left(E\left[\frac{\|H - H^{CS}\|_F^2}{\|H\|_F^2}\right]\right)$$

It can be seen that under different Signal Noise Ratio (SNR), the estimation errors of the three schemes become smaller and smaller with the increase of the Signal Noise Ratio. The performance of Oracle estimation is the best because it assumes that the angle of arrival/departure is known, and only the path gain needs to be estimated. Among the actual estimation algorithms, OMP estimation is superior to LS estimation algorithm because it uses fewer training beams and the number of measurements $$N_t^{beam} N_t^{beam} < N_t N_r,$$

LS estimation can only achieve partial training. Generally, LS estimation requires $$N_t^{beam} N_t^{beam} \geq N_t N_r$$

for full training. In OMP estimation, when the signal noise ratio is greater than 0 db, the error is less than −10 dB, so the scheme can reliably realize channel estimation, and the channel parameter of the estimated path gain will be used as the quantization parameter of key generation.

At a step of 102, a key is generated according to the channel characteristic parameter.

Specifically, the process of generating a key according to the channel characteristic parameter is called quantization, and its main process includes: determining the quantization threshold according to the preset quantization strategy; mapping the channel characteristic parameter into a bit value according to the quantization threshold. It is understandable that a key is a binary string composed of bit values. The quantization strategies can generally be divided into two categories: those based on mean $\mu$ and standard deviation $\sigma$ in normal distribution, and those based on cumulative distribution function (CDF). Further, determining the quantization threshold according to the preset quantization strategy, and then mapping the channel characteristic parameters obtained in step 101 to the preset values according to the quantization threshold. The preset values generally use bit values.

Here, the quantization strategy based on the mean $\mu$ and standard deviation $\sigma$ in the normal distribution is simple to implement, and the quantization threshold is $$\eta^+ = \mu + \alpha \times \sigma$$

$$\eta^- = \mu - \alpha \times \sigma$$

When $\alpha \neq 0$, the measured values between $\eta^+$ and $\eta^-$ will be discarded, the samples higher than $\eta^+$ will be mapped to 1, and the samples lower than $\eta^-$ will be mapped to 0, however, discarding some measured values will affect the key generation rate.

The quantization strategy based on cumulative distribution function (CDF) is more flexible and can design multi bit quantization.

In one example, assuming that the current millimeter wave channel has ten spatial propagation paths after detection, then the channel characteristic parameter of each path of the ten spatial propagation paths are respectively determined, and the ten channel characteristic parameters are mapped into ten binary strings composed of bit values according to the quantization strategy, thereby generating a key composed of ten binary strings.

At a step of 103, after continuously generating multiple keys, a first key matrix is captured by means of a sliding window having a preset length, to obtain a second key matrix.

Specifically, as the change of channel gain parameters in time, multiple different keys can be obtained according to multiple groups of different channel characteristic parameters through multiple channel estimations (each channel estimation can generate a key), and a first key matrix is formed by arranging multiple keys according to time and combining together. The preset length of the sliding window refers to capturing the number of columns of the first matrix, capturing the first matrix by means of a sliding window having a preset length, that is, capturing a matrix with a fixed number of columns from the first matrix each time in sequence as the second key matrix. After each capture, the window is moved backward one position for next capture.

At a step of 104, a correlation between keys in the second key matrix is determined, and key substitution on the keys in the second key matrix is performed when the correlation between the keys in the second key matrix is greater than a preset threshold.

Specifically, the captured second key matrix contains multiple keys, and the number of keys obtained by a single capture is related to the length of the sliding window. After capturing the second key matrix, the correlation between the keys is determined. When the correlation meets the preset threshold, the keys in the second key matrix are added directly to the key pool for channel encryption; and when the correlation does not meet the preset threshold, key substitution on the keys is performed. The way of key substitution is to give values to some bits of the key, so that the new key generated after the substitution has high randomicity and can meet the security requirements of the channel. In addition, since the base stations and users at both ends of the channel have agreed on quantization and key substitution rules, they can operate synchronously to obtain keys with higher consistency.

At a step of 105, the keys in the second key matrix is added to a key pool until the number of the keys in the key pool reaches a preset number.

Specifically, after performing key substitution on the keys in the second key matrix, the correlation between the keys in the second key matrix is less than the preset threshold, and then the keys in the second key matrix are added to the key pool for channel encryption. The number of keys in the key pool has a preset upper limit. When the number of existing keys in the key pool reaches the upper limit, the keys will no longer be added to the key pool until the keys in the key pool are removed from the key pool after being used.

In the key generation method of this embodiment, the bit stream is captured by means of the sliding window, and multiple groups of keys are obtained from the bit stream quantized by the channel characteristic parameters obtained from a channel detection, thereby increasing the number of keys at a fixed channel detection rate, and ensuring that the key generation rate meets the user's requirements while ensuring the randomicity of the key.

It should be noted that the above examples in this embodiment are examples for easy understanding and do not limit the technical solution of this application.

The second embodiment of the present application relates to a key generation method. The second embodiment is roughly the same as the first embodiment, and the main difference is that: in the second embodiment, performing key substitution on the keys in the second key matrix, including: performing substitution operation on the last key in the second key matrix bit by bit, and determining the correlation of the keys in the second key matrix once each substitution operation is completed; adding the keys in the second key matrix to the key pool when the correlation between the keys in the second key matrix is not greater than the preset threshold; where the key added to the key pool is the last key.

Figure 3:
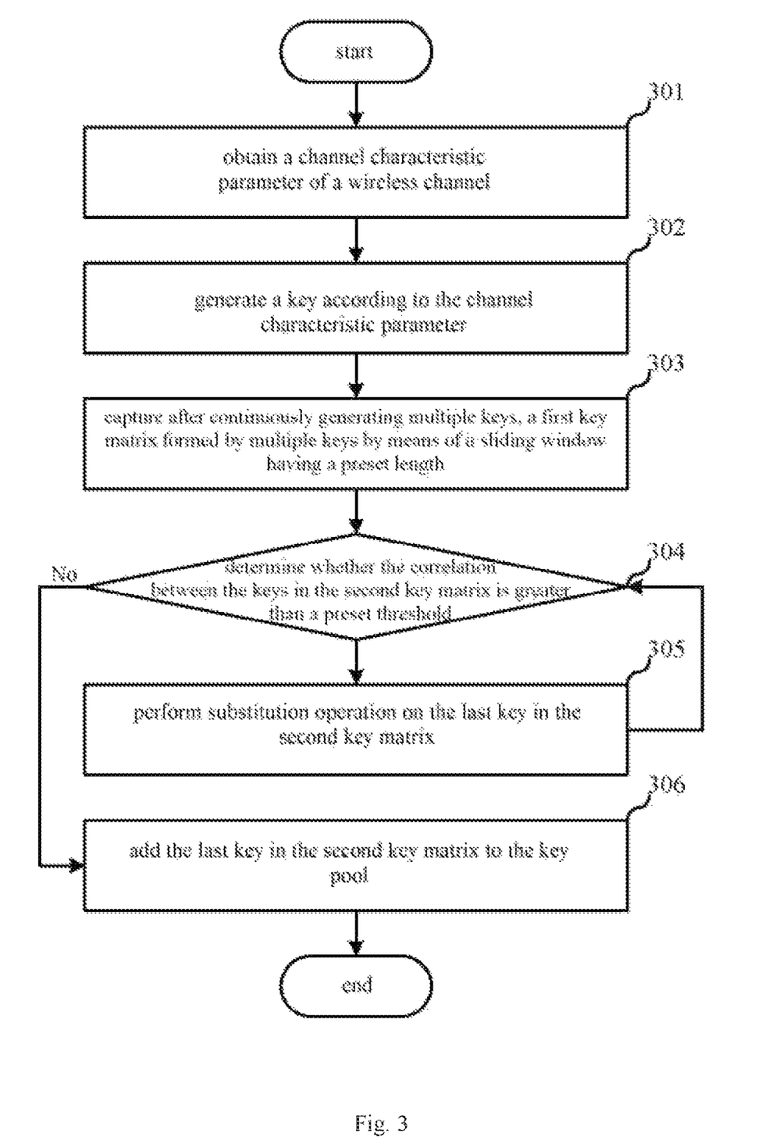
FIG. 3 is a flowchart of a key generation method according to a second embodiment of the present application.

This embodiment is illustrated below with reference to the drawings. The key generation method in this embodiment is shown in FIG. 3, and includes step 301 to step 306.

At a step of 301, a channel characteristic parameter of a wireless channel is obtained.

At a step of 302, a key according to the channel characteristic parameter is generated.

At a step of 303, after continuously generating multiple keys, a first key matrix formed by multiple keys is captured by means of a sliding window having a preset length.

Steps 301 to 303 are the same as steps 101 to 103 in the first embodiment of the present application. The relevant implementation details have been specifically described in the first embodiment, and will not be repeated here.

At a step of 304, it is determined whether the correlation between the keys in the second key matrix is greater than a preset threshold; if the correlation between the keys in the second key matrix is greater than the preset threshold, step 305 of performing substitution operation on the last key in the second key matrix is performed, and step 304 is performed again; if the correlation between the keys in the second key matrix is not greater than the preset threshold, step 306 of adding the last key in the second key matrix to the key pool is performed.

Specifically, the captured second key matrix contains multiple keys, and the number of keys obtained by a single capture is related to the length of the sliding window. After capturing the second key matrix, the correlation between the keys is determined. When the correlation meets the preset threshold, the keys in the second key matrix are added directly to the key pool for channel encryption; and when the correlation does not meet the preset threshold, key substitution on the keys is performed. Here, performing key substitution refers to substitute the codeword of the key bit by bit. When the correlation is still greater than the preset threshold after all the bits of the key substituted, the key is removed from the first key matrix, and then the next key outside the sliding window is added into the sliding window to calculate the correlation again. The way of key substitution is to give the value to some bits of the key, so that the new key generated after the substitution has higher randomicity and can meet the security requirements of the channel. In addition, since the base stations and users at both ends of the channel have agreed on quantization and key substitution rules, they can operate synchronously to obtain keys with higher consistency.

In an example, the average Hamming distance is used to measure the correlation between a group of keys. Assuming that the size of the designed sliding window W is 5, and initially contains five groups of key sequences [$k_1, k_2, k_3, k_4, k_5$], $k_i$ is column vectors, that is, a key generated after a channel estimation. The average Hamming distance $\bar{\mu}$ of five groups of keys in the sliding window is calculated, where W(m) represents the m-st column of the window, $D(W)=\Sigma_{1 \leq m<n \leq 5}\text{dist}(W(m),W(n))$ is the sum of Hamming distances between each column. When the $\bar{\mu} \geq \delta$, the five keys in the window are quite different, and the average Hamming distance exceeds the preset threshold $\delta$, which meets the randomicity requirements. The last key $k_j$ in the window can be put into the key pool, and move the window one position to the right to verify the randomicity of the following five groups of keys. If $\bar{\mu}<\delta$, it indicates that the average distance of the five keys in the current window is small, and the randomicity of the key is insufficient. At this time, the last column $k_j$ of the window, which contains N bits, is taken to carry out the substitution operation for its N bits in turn: 0 becomes 1 (1 becomes 0). Every time a bit substitution is performed, the average Hamming distance $\bar{\mu}$ of the second key matrix at the window is recalculated. When $\bar{\mu} \geq \delta$, the second key matrix in the window meets the randomicity requirements, last column $k_j$ of the second key matrix is added into the key pool. If the Hamming distance of the second key matrix of the window cannot reach the threshold standard after N bits substitution, the last column $k_j$ is discarded and the next group of keys is added into the window for a new round of randomicity verification. The sliding window continuously verifies 200 groups of key sequences and outputs the keys with high randomicity.

In specific applications, in the above example, the process for capturing the first key matrix by means of the sliding window having a preset length to obtain the second key matrix, and the key substitution process can be realized by the following program code:

```
input:  k_i, i = 1, . . ., 200
1:   initialization:  j = 5,  S = [k_1^T, k_2^T, k_3^T, k_4^T],  W = [k_1, k_2, k_3, k_4, k_5]
2:   while  j ≤ 200, do
3:          μ̄ = D(W)/C_5^2
4:       if  μ̄ ≥ δ
             S = S ∪ W(5)^T, j = j + 1, W = [W(2), W(3), W(4), W(5), k_j]
             continue
          else
5:          for  i = 1:N
                k_ji = k̂_ji, μ̄ = D(W)/C_5^2,
6:             if  μ̄ ≥ δ
                   S = S ∪ W(5)^T, j = j + 1,
                   W = [W(2), W(3), W(4), W(5), k_j], break
                end if
             end for
7:          if  μ̄ ≥ δ
                   j = j + 1,
                W = [W(2), W(3), W(4), W(5), k_j]
             continue
          end if
       end while
output:  S
```

In addition, this embodiment also provides a sliding window randomicity test method, specifically as follows:

For the multi-bit adaptive quantization (MAQ) scheme, a group of keys (5 bits) may be generated through each channel implementation, and the sliding window contains five groups of keys, that is W is the matrix of 5×5. Using the sliding window to check the randomicity of the key. If the correlation of the five groups of keys in the window is too high, the bit of the last group of keys is modified to reduce the correlation of the keys in the window. When SNR=10, 200 groups of keys (1000 bits) are selected for sliding window test, and the remaining bits that meet the randomicity requirements are compared when different preset correlation coefficient thresholds δ are used, as shown in the following table. The larger the δ is, the higher the randomicity of the second key matrix is required, the number of unqualified keys increases, that is, be discarded, and the number of remaining bits decreases. When the δ is too large, the number of remaining bits will decrease rapidly.

| δ | 2.5 | 2.6 | 2.7 | 2.8 | 2.9 | 3.0 | 3.1 |
|---|---|---|---|---|---|---|---|
| the number of bits | 885 | 885 | 755 | 755 | 585 | 585 | 20 |

For the key sequences that have passed the sliding window strategy, using NIST statistical tests to test their randomicity. The NIST test kit contains 16 test methods to evaluate different random characteristics. Each method returns a P value, it indicates that the sequence is random when P≥α. Here, α=0.01, and the key sequence is 885 bits when δ=2.5. We select four test methods from NIST test kit to evaluate the randomicity of keys, as shown in the following table. It can be seen that the returned P≥0.01, the key generated by the sliding window strategy meets the randomicity requirements. For the 1000 bits key sequence without sliding window, the sequence tested P=6.3045 e$^{-9}$ the randomicity does not meet the requirements.

| Test Item | Frequency Test | Block Frequency Test | Sequence Test | Accumulation Sum Test |
|---|---|---|---|---|
| P | 0.0554 | 0.0045 | 0.2198 | 0.0947 |

In the key generation method in this embodiment, the bit stream is captured by means of a sliding window, multiple groups of keys are obtained from the bit stream quantized by the channel characteristic parameter obtained by a channel detection, it is determined whether the correlation between the keys in a group meets the requirements, and the unsatisfied keys are substituted, so as to better ensuring that the randomicity of the keys can meet the security requirements of the channel.

The third embodiment of the present application relates to a key generation method. The third embodiment is roughly the same as the first embodiment, and the main difference is that: in the third embodiment, the channel characteristic parameters is quantized by using a multi-bit adaptive quantization strategy based on the cumulative distribution function (CDF), and the measured values of the channel characteristic parameters are mapped into bit values.

Figure 4:
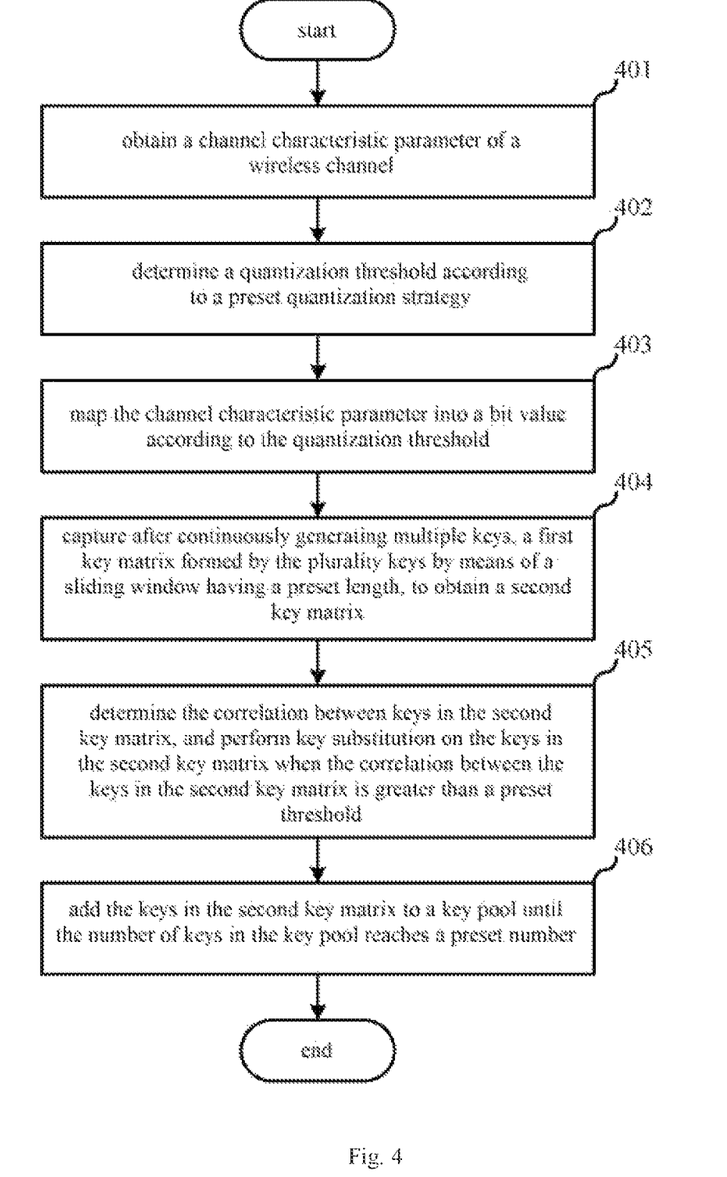
FIG. 4 is a flowchart of a key generation method according to a third embodiment of the present application.

This embodiment is illustrated below with reference to the drawings. The key generation method in this embodiment is shown in FIG. 4, and includes step 401 to step 406.

At a step of 401, a channel characteristic parameter of a wireless channel is obtained.

Step 401 is the same as step 101 in the first embodiment of the present application, and the relevant implementation details have been specifically described in the first embodiment, and will not be repeated here.

At a step of 402, the quantization threshold is determined according to the preset quantization strategy.

At a step of 403, the channel characteristic parameter is mapped into a bit value according to the quantization threshold.

Specifically, the quantization strategy is implemented by the quantizer. The quantization threshold is set through the design of the quantizer. Through the adjustment of the quantization level and the quantization threshold, the generated key can meet the randomicity requirements, better generation rate and inconsistency rate.

Further, the specific algorithm using the multi-bit adaptive quantization strategy is as follows:

--- input: gain estimation of the N-th path of the base station
$\alpha(i)$, i = 1, 2, ..., N
1:   $K \triangleq 2^{m_i+2} = 4 \times 2^{m_i}$
2:   $\alpha(i)$'s CDF $F_i(y) = P[\alpha(i) \leq y]$ 3:   $\eta_k = F_i^{-1}\left(\dfrac{k}{4 \times 2^{m_i}}\right), k = 1, ..., K-1$ 4:   $\eta_0 = -\infty$, $\eta_K = \infty$, $k(i) = \max\{k \text{ s. t. } \alpha(i) > \eta_{k-1}\}$ 5:   $e(k) = \begin{cases} 1, & k \bmod 4 \geq 2 \\ 0, & k \bmod 4 < 2 \end{cases} k = 1, ..., K$ 6:   $f_1(k) = \left|\dfrac{k-1}{4}\right|, d_1(k) = B_{f_1(k)}$ 7:   $f_0(k) = \left|\dfrac{(k+1) \bmod K}{4}\right|, d_0(k) = B_{f_0(k)}$ output: $z = [d_{e(k(1))}(k(1)), ..., d_{e(k(N))}(k(N))]$

---

Assuming that the base station is the leader node and the user is the follower node. The estimated path gain sequence on the base station side is $\alpha(i)$, i=1, 2, ..., N. For each path gain, the quantization level number is $K=4\times 2^{m_i}$, $m_i$ is the quantized bit number. Steps 2 and 3 is to calculate the cumulative distribution function $F_i(y)$ of (i), whose inverse function is the quantization threshold $\eta_k$. The k-th quantization interval is expressed as $(\eta_{k-1}, \eta_k]$, k=1, ..., K, the quantization interval index of $\alpha(i)$ is represented by k(i). The binary variable e(k) is designed as the binary representation of k for subsequent codeword selection. The ordered Gray Code B containing $2^{m_i}$ codewords is listed, and the length of each codeword is $m_i$ bits. Assign the $f_1(k)$-th codeword in B to the codeword $d_1(k)$ of MAQ. $d_0(k)$ is obtained by cyclic shift 2 positions of $d_1(k)$. The base station first determines the quantization interval k(i) for the estimated N $\alpha(i)$, and sends the vector $e=[e(k(1)), ..., e(k(N))]^T$ to the user. When e=1, the base station and the user select the codeword $d_1$, and when e=0, the base station and the user select the codeword $d_2$. Then finally the key $z=[d_{e(k(1))}(k(1)), ..., d_{e(k(N))}(k(N))]$ is obtained.

In the case of $m_i=1$, the codewords of multi-bit adaptive quantization are shown in the following table:

| quantizing interval k | Codeword $d_1$ | Codeword $d_0$ | e | $\alpha(i)$ interval |
|---|---|---|---|---|
| 1 | 0 | 0 | 0 | $(-\infty, F_i^{-1}(0.125)]$ |
| 2 | 0 | 0 | 1 | $(F_i^{-1}(0.125), F_i^{-1}(0.25)]$ |

-continued

| quantizing interval k | Codeword $d_1$ | Codeword $d_0$ | e | α(i) interval |
|---|---|---|---|---|
| 3 | 0 | 1 | 1 | $(F_i^{-1}(0.25), F_i^{-1}(0.375)]$ |
| 4 | 0 | 1 | 0 | $(F_i^{-1}(0.375), F_i^{-1}(0.5)]$ |
| 5 | 1 | 1 | 0 | $(F_i^{-1}(0.5), F_i^{-1}(0.625)]$ |
| 6 | 1 | 1 | 1 | $(F_i^{-1}(0.625), F_i^{-1}(0.75)]$ |
| 7 | 1 | 0 | 1 | $(F_i^{-1}(0.75), F_i^{-1}(0.875)]$ |
| 8 | 1 | 0 | 0 | $(F_i^{-1}(0.825), +\infty)$ |

At a step of 404, after continuously generating multiple keys, a first key matrix formed by the plurality keys is captured by means of a sliding window having a preset length.

At a step of 405, the correlation between keys in the second key matrix is determined, and key substitution on the keys in the second key matrix is performed when the correlation between the keys in the second key matrix is greater than a preset threshold.

At a step of 406, the keys in the second key matrix is added to a key pool until the number of keys in the key pool reaches a preset number.

Steps 404 to 406 are the same as steps 103 to 105 in the first embodiment of the present application, and the relevant implementation details have been specifically described in the first embodiment, and will not be repeated here.

Figure 5:
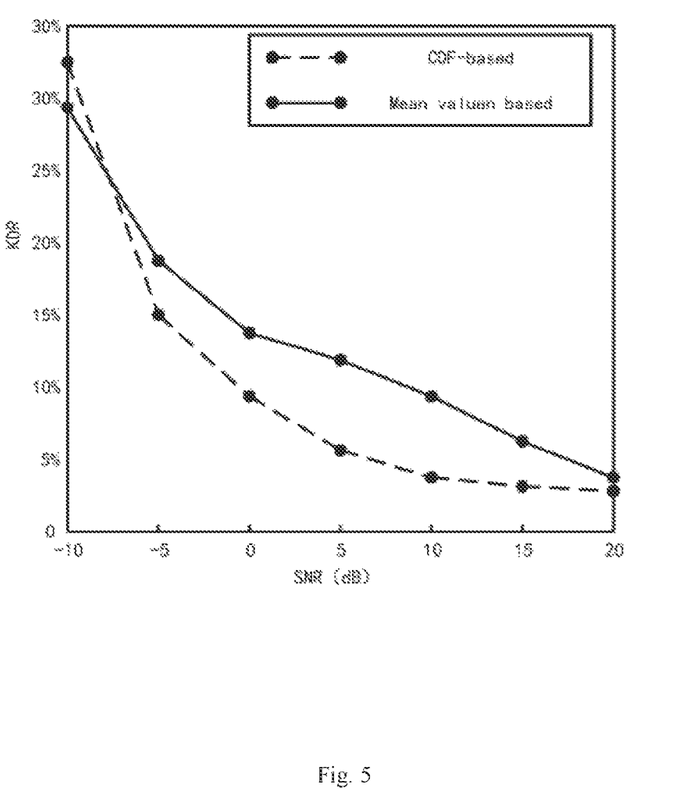
FIG. 5 is a statistical diagram for an inconsistency rate under different quantization strategies in a third embodiment of the application.

In addition, this embodiment also provides performance analysis of different quantization strategies, as follows:

In the channel detection phase, since the channel contains five propagation paths, the gain of five paths can be estimated for each channel implementation, and the module values of the path gain can be used as the quantization parameter. The module values of 2000 path gains obtained from 400 channel detections are used as the input parameters of the MAQ quantization scheme. The quantized bits of each parameter are $m_i=1$, and the total quantization level K=8. After multi-bit adaptive quantization, a key string with a length of 2000 bits can be obtained. In the Time Division Duplexing (TDD) system, the key generation between the base station and the user is based on the reciprocity of the wireless channel. However, due to the influence of additive noise, the channel parameters estimated by the base station and the user are not completely consistent, so the key will be inconsistent. For a bit string with a length of 2000, as shown in FIG. 5, the key inconsistency rate of the quantization method based on the cumulative distribution function (MAQ) and the quantization method based on the mean value and standard deviation is compared under different signal noise ratios. It can be found that, in the two quantization methods, the smaller the noise is, the smaller the impact on the symmetric key generated by both parties of the communication is, and the key inconsistency rate is reduced. Meanwhile, the performance of the MAQ quantization is better than that of the quantization method based on mean value. In the quantization process of the latter, in order to ensure a certain randomicity of the key, some consecutive repeated bits are discarded, resulting in a decrease in the key generation rate.

The step division of the above methods is only for the sake of clear description, which can be combined into one step or some steps can be split into multiple steps during implementation. As long as the same logical relationship is included, it is within the protection scope of this patent. Adding insignificant modifications to algorithms or processes or introducing insignificant designs without changing the core design of algorithms and processes are within the scope of protection of the patent.

Figure 6:
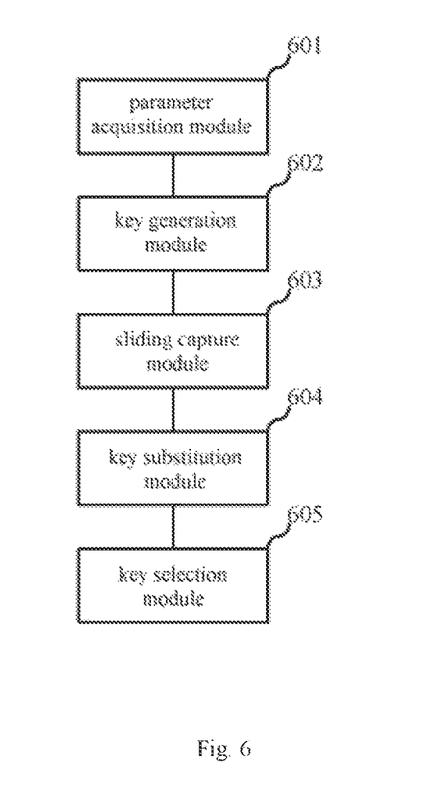
FIG. 6 is a structural diagram of a key generation apparatus according to a fourth embodiment of the present application.

In the fourth embodiment of the present application, as shown in FIG. 6, a key generation apparatus is involved, and the key generation apparatus includes: a parameter acquisition module 601, a key generation module 602, a sliding capture module 603 and a key substitution module 604.

The parameter acquisition module 601 is configured for obtaining a channel characteristic parameter of a wireless channel.

The key generation module 602 is configured for generating a key according to the channel characteristic parameter.

The sliding capture module 603 is configured for capturing after continuously generating multiple keys, a first key matrix formed by a plurality of the keys by means of a sliding window having a preset length, to obtain a second key matrix.

The key substitution module 604 is configured for determining a correlation between the keys in the second key matrix, and performing key substitution on the keys in the second key matrix when the correlation between the keys in the second key matrix is greater than a preset threshold.

In an example, the key replacement module 604 is also used for performing substitution operation on the last key in the second key matrix bit by bit, and determining the correlation of the keys in the second key matrix once each substitution operation is completed; adding the keys in the second key matrix to the key pool when the correlation between the keys in the second key matrix is not greater than the preset threshold; here, the key added to the key pool is the last key.

In another example, the key substitution module 604 is also used for determining the correlation of the keys in the second key matrix once each substitution operation is completed, and then discarding the last key when the correlation between the keys in the second key matrix is greater than the preset threshold after all the bits of the last key are substituted.

The key selection module 605 is configured for adding the keys in the second key matrix to a key pool until the number of the keys in the key pool reaches a preset number.

It is worth mentioning that all the modules involved in this implementation are logical modules. In practical applications, a logical unit can be a physical unit, or a part of a physical unit, or can be implemented in combination of multiple physical units. In addition, in order to highlight the innovation part of the present application, the embodiment does not introduce units that are not closely related to solving the technical problems raised by the present application, but this does not mean that there are no other units in the embodiment.

Figure 7:
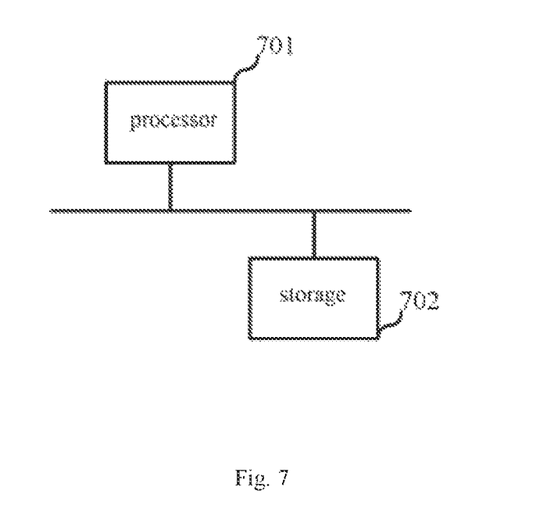
FIG. 7 is a structural diagram of an electronic device according to a fifth embodiment of the present application.

The fifth embodiment of the present application relates to an electronic device, as shown in FIG. 7, including at least one processor 701; and a storage 702 in communication with the at least one processor 701. The storage 702 stores instructions that can be executed by the at least one processor 701 to enable the at least one processor 701 to execute the key generation method in the first, second, or third embodiments. The storage 702 and processor 701 are connected in a bus mode. The bus can include any number of interconnected buses and bridges. The bus connects various circuits of one or more processors 701 and storages 702. The bus can also connect various other circuits such as peripheral devices, voltage regulators, power management circuits, etc., which are well known in the art. Therefore, it will not be further described herein. The bus interface provides an interface between the bus and a transceiver. The transceiver may be one element or a plurality of elements, such as a plurality of receivers and transmitters, providing a unit for communicating with various other apparatus on a transmission medium. The data processed by the processor 701 is transmitted on the wireless medium through the antenna, and furthermore, the antenna also receives the data and transmits the data to the processor 701. The processor 701 is responsible for managing the bus and general processing, and may also provide various functions, including timing, peripheral interfacing, voltage regulating, power managing, and other control functions. The storage 702 may be used to store data used by the processor 701 in performing operations.

The sixth embodiment of the present application relates to a computer-readable storage medium, which stores a computer program. The above method embodiment is implemented when the computer program is executed by the processor. That is, those skilled in the art can understand that the implementation of all or part of the steps in the method of the above embodiments can be completed by instructing the relevant hardware through a program, which is stored in a storage medium, and includes several instructions to enable a device (can be a single-chip computer, a chip, etc.) or a processor to perform all or part of the steps of the method in each embodiment of the present application. The aforementioned storage media includes: USB, mobile hard disk, read only memory (ROM), random access memory (RAM), magnetic disc or optical disc and other media that can store program codes. Those skilled in the art can understand that the above embodiments are specific embodiments to implement the present application, and in practical applications, various changes can be made to them in form and detail without departing from the spirit and scope of the present application.

The invention claimed is:

1. A key generation method comprising:
    obtaining a channel characteristic parameter of a wireless channel;
    generating a key according to the channel characteristic parameter;
    capturing after continuously generating multiple keys, a first key matrix formed by a plurality of the keys by means of a sliding window having a preset length, to obtain a second key matrix;
    determining a correlation between keys in the second key matrix, and performing key substitution on the keys in the second key matrix when the correlation between the keys in the second key matrix is greater than a preset threshold; and
    adding the keys in the second key matrix to a key pool until the number of the keys in the key pool reaches a preset number.

2. The key generation method of claim 1, wherein the channel characteristic parameter is obtained through a preset channel model of a narrow-band cluster ray model; the channel characteristic parameter is a path gain parameter.

3. The key generation method of claim 1, wherein generating the key according to the channel characteristic parameter comprises:
    quantizing the channel characteristic parameter, wherein a step of quantization operation comprises:
    determining a quantization threshold according to a preset quantization strategy;
    mapping the channel characteristic parameter into a bit value according to the quantization threshold.

4. The key generation method of claim 3, wherein the quantization strategy is a quantization strategy based on a probability density function.

5. The key generation method of claim 1, wherein performing key substitution on the keys in the second key matrix comprises:
    performing substitution operation on the last key in the second key matrix bit by bit, and determining the correlation of the keys in the second key matrix once each substitution operation is completed;
    adding the keys in the second key matrix to the key pool when the correlation between the keys in the second key matrix is not greater than the preset threshold; wherein the key added to the key pool is the last key.

6. The key generation method of claim 5, wherein after determining the correlation of the keys in the second key matrix once each substitution operation is completed, the method further comprises:
    discarding the last key when the correlation between the keys in the second key matrix is greater than the preset threshold after all the bits of the last key are substituted.

7. The key generation method of claim 5, wherein determining the correlation of the keys in the second key matrix comprises:
    calculating an average Hamming distance of the keys in the second key matrix;
    determining the correlation of the keys in the second key matrix according to the average Hamming distance.

8. The key generation method of claim 5, wherein generating the key according to the channel characteristic parameter comprises:
    quantizing the channel characteristic parameter, wherein a step of quantization operation comprises:
    determining a quantization threshold according to a preset quantization strategy;
    mapping the channel characteristic parameter into a bit value according to the quantization threshold.

9. An electronic device comprising:
    at least one processor; and
    a storage in communication with the at least one processor; wherein, the storage stores instructions that is executable by the at least one processor, the instructions when executed by the at least one processor, enables the at least one processor performs the key generation method of claim 1.

10. A non-transitory computer-readable storage medium storing a computer program, the computer program when executed by the processor, implements the key generation method of claim 1.

* * * * *